United States Patent [19]

Michanczyk

[11] Patent Number: 4,838,567
[45] Date of Patent: Jun. 13, 1989

[54] RUNNING BOARD

[76] Inventor: Gary F. Michanczyk, 48 Pond View Rd., Southington, Conn. 06489

[21] Appl. No.: 153,489

[22] Filed: Feb. 3, 1988

Related U.S. Application Data

[63] Continuation-in-part of Ser. No. 67,160, Jun. 29, 1987, abandoned.

[51] Int. Cl.⁴ .............................................. B60R 3/00
[52] U.S. Cl. .................................. 280/163; 296/75
[58] Field of Search .................. 280/163, 164 R, 169; 362/81; 296/75

[56] References Cited

U.S. PATENT DOCUMENTS

| | | | |
|---|---|---|---|
| 1,215,721 | 2/1917 | Schuyler | 280/163 |
| 1,406,728 | 2/1922 | Green | 280/163 |
| 1,427,763 | 8/1922 | Stoll | 280/163 |
| 1,439,481 | 12/1922 | Prehn | 280/163 |
| 1,515,717 | 11/1924 | Ayotte | 362/81 |
| 1,735,948 | 11/1929 | Boca | 280/163 |
| 1,825,012 | 9/1931 | Ornberg | 280/163 |
| 2,081,899 | 6/1937 | Bridge | 362/81 |
| 2,561,756 | 7/1951 | Shook | 362/81 |
| 4,203,611 | 5/1980 | Makela | 280/163 |
| 4,451,063 | 5/1984 | Snyder | 280/163 |
| 4,456,275 | 6/1984 | Snyder et al. | 280/163 |
| 4,463,962 | 8/1984 | Snyder | 280/164 R |
| 4,544,991 | 10/1985 | Gorsuch | 280/164 R X |
| 4,557,494 | 12/1985 | Elwell | 280/164 R |

*Primary Examiner*—Charles A. Marmor
*Assistant Examiner*—Tamara L. Finlay
*Attorney, Agent, or Firm*—F. R. Hirtler

[57] ABSTRACT

A running board for a motor vehicle comprising a platform, a plurality of carriers and reinforcing cross member supporting the platform, the carriers being attached to the lower ends of mounting bars, the upper ends thereof having attached cantilever bars which are also fastened onto the carriers forming a cantilevered support system for the platform; optionally a vertical cover panel is provided possible carrying illumination for the platform.

1 Claim, 1 Drawing Sheet

RUNNING BOARD

This is a continuation-in-part of patent application Ser. No. 067,160 filed June 29, 1987, now abandoned.

This invention is concerned with a running board useful for motor vehicles, especially for pickup trucks.

BACKGROUND OF THE INVENTION

The use of running boards for vehicles such as for automobiles, pickup trucks, trailer trucks or earth moving equipment has been known as a remnant from horse drawn carriage days essentially from the beginning of the automotive era, however, in more recent years, the employment of running boards on vehicles including pickup trucks has diminished be it due to new design or change in fashion. However, it has been found that there is a need for such running boards especially for pickup trucks for reasons of improved ease of entering or leaving the cab, prevention of excessive splashing of debris against side of vehicle by (turned) front wheels or for reasons of aesthetics. Care has to be taken that such running board is properly and safely mounted, and it is desirable that such board has a certain eye appeal.

Certain references of interest deal with a variety of aspects of running boards namely:

U.S. Pat. No. 2,081,899 (Bridge) teaches a running board for a car which provides illumination onto the road or the underside of the car; there is no indication how the running board is mounted, and no cantilevered support is mentioned.

U.S. Pat. No. 2,561,756 (Shook) describes means for lighting a running board for cars; no mounting provisions are suggested except for the light fixture.

U.S. Pat. No. 4,456,275 (Snyder et. al.) deals with a running board for a vehicle which is mounted to the frame of said vehicle by a single I-beam plus mounting arm type arrangement. A dual support system, i.e. by providing fastening means against frame and rocker panel, is neither mentioned nor anticipated.

U.S. Pat. No. 4,463,962 (Snyder et. al.) essentially duplicates the disclosure of above U.S. Pat. No. 4,456,275.

U.S. Pat. No. 4,544,991 (Gorsuch) discloses a lighted running board for vehicles such as vans; no mention is made of how such running board ought to be mounted.

U.S. Pat. No. 4,557,494 (Elwell) is concerned with a running board carrying a series of lighting elements; attaching the running board to the vehicle is only superficially dealt with.

None of the above references seem to provide a running board which carries in combination several aspects considered essential by this invention as further described below.

SUMMARY OF THE INVENTION

It is the object of this invention to provide a running board for vehicles that allows improved ease of entering of leaving such vehicle;

It is another object of this invention to provide a running board which is sound deadening and non-corrosive;

It is a further object of the invention to provide improved means for fastening a running board onto a vehicle;

It is still another object of this invention to provide a running board which is ornamental because it is made from wood or imitation thereof.

It is still a further object of this invention to provide a running board which is adaptable to a variety of makes of vehicles.

Other objects shall become apparent by the description of the invention and appended claims.

PREFERRED EMBODIMENTS OF THE INVENTION

Figure 1:
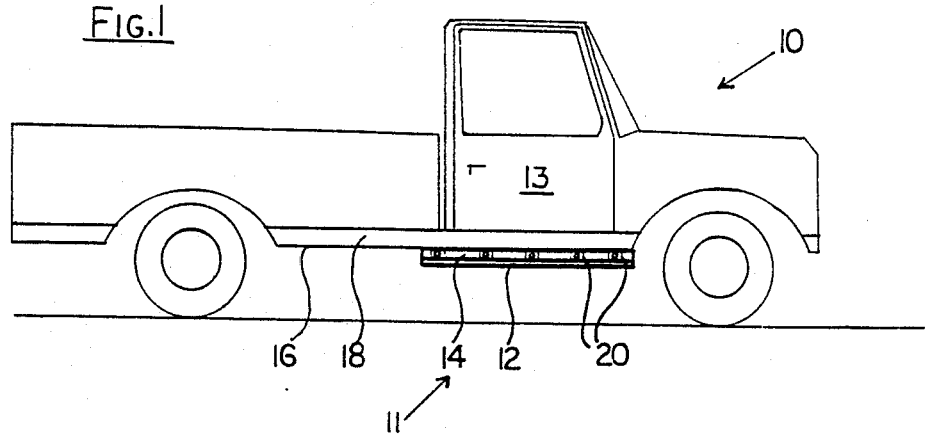
FIG. 1 is an elevated side view of a pickup truck having a running board of this invention mounted thereon.

FIG. 1 depicts the stylized outline of a pickup truck 10 in order to demonstrate the location at which the running board 11 of this invention is mounted; said running board 11 comprising actual platform 12, cover panel 14 and optional light fixtures 20, all situated below rocker panel 16 (of which outer member 18 is shown) and below cab door 13.

Figure 2:
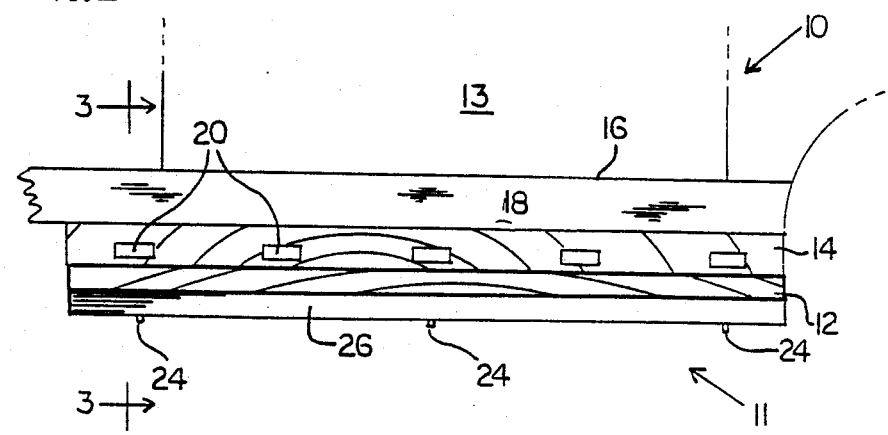
FIG. 2 is an elevated enlarged side view of the running board shown in FIG. 1.

FIG. 2 provides a partial view of truck 10 with running board 11 including platform 12 which is located on top of L-shaped steel carriers 24 (only partially shown) and support bar 26; the space between platform 12 and rocker panel 16 is taken up by cover board 14 which may optionally carry lighting fixtures 20 designed to illuminate the platform if so desired.

Figure 3:
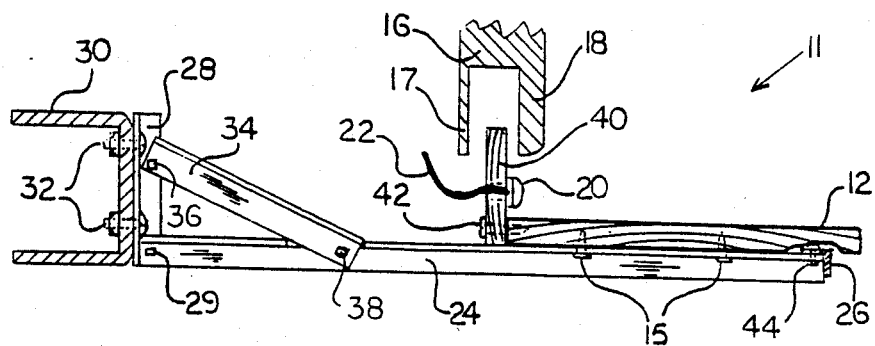
FIG. 3 is a cross sectional view of FIG. 2.

A cross sectional view of FIG. 2 is provided in FIG. 3 indicating how the running board 11 is attached to a vehicle frame in accordance with this invention; i.e. platform 12 is fastened onto carriers 24 (only one shown) by screw 15, such carrier 24 extends under the rocker panel 16 to mounting bar 28 which is secured against U-frame member 30 of vehicle by nut and bolt combination 32; onto the lower portion of said mounting bar 28 is attached carrier 24 by use of carriage bolt type means 29, and onto the upper portion of said mounting bar 28 there is fastened with carriage bolt 36 one end of cantilever bar 34 which provides improved firmness and stability to the running board construction because the other end of bar 34 is fastened to carrier 24 by means of carriage bolt 38; there is provided vertical support 40 which extends into cavity 19 formed by outer member 18 and inner member 17 of rocker panel 16 and being mounted against the back end of platform 12 by screw 42; said vertical support may also serve to carry running board lights 20, the latter being tied into the light system with cable 22. It will be noted that support bar 26 overlaps the outer ends of carriers 24 and is attached thereto with nut and bolt means 44.

Figure 4:
FIG. 4, 5 and 6 are top plan views of alternate designs of the running board of this invention.
Figure 5:
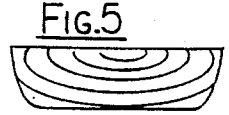
Figure 6:
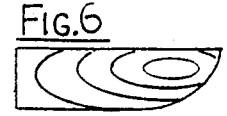

FIG. 4, 5 and 6 illustrate a variety of shapes the platform of the running board of this invention may take depending on the type vehicle, etc. to be attached to.

The cantilevered construction of the instant running board support provides excellent stability and safety for the user even if relatively heavy loads are placed on the platform.

Relying on the rocker panel section of a truck or similar vehicle for support of a running board assembly is considered much less desirable and reliable. Furthermore, fastening a running board assembly onto frame and body (i.e. rocker panel) sections is not advisable because while in motion and especially when loaded and/or moving over uneven terrain, considerable movement of the body vis-a-vis the frame occurs which would set the running board assembly under undue stress causing possible distortion or even failure.

Besides its exceptional stability, the running board support of this invention can be relatively easily assembled, adjusted or, for that matter, removed.

For the platform and cover board, wood is preferred over other materials of construction such as steel or aluminum because of its ease of workability, non-corrosiveness, durability and decorative effect. For the supporting members, I-, L- or other shaped steel stock may be employed in accordance with sound engineering practice well known to the art. The lighting fixtures, if made part of the running board construction, may be either attached to the outer surface of the cover board or may be placed in a recessed manner in said cover board. Although it is indicated that the running board of this invention is fastened by means of nuts and bolts and the like, welding means may be employed where feasible.

It will be appreciated that the running board construction of this invention provides firmness and safety superior to what is known in the art, and this invention is considered filling a need where the use of a running board is desired especially on vans, panel trucks and pickup trucks.

Variations of this invention not specifically disclosed in the above specification may yet still fall well within the scope of the appended claims.

What is claimed is:

1. A single board assembly attached to a frame of a vehicle comprising:
    a plurality of carriers each having a first end and a second end;
    a plurality of mounting bars attached to said frame in a vertical orientation each having a first end and a second end;
    a plurality of cantilever bars each having a first end and a second end;
    wherein, said first end of each said carrier is attached to said first end of one of said mounting bars, said first end of each said centilever bar is attached to one of said mounting bars and said second end of each said cantilever bar is attached to one of said carriers thereby forming a triangle;
    said second ends of said plurality of carriers being interconnected by a support bar;
    a platform fastened onto said plurality of carriers;
    a cover panel attached to said platform and extending vertically into a cavity formed by a bifurcated lower end of a rocker panel of said vehicle.

* * * * *